(12) United States Patent
Harris

(10) Patent No.: US 11,146,442 B1
(45) Date of Patent: Oct. 12, 2021

(54) PRESENTING A USER PROFILE PAGE INCLUDING AN ANIMATION ASSOCIATED WITH A TYPE OF LIFE EVENT DESCRIBED BY CONTENT POSTED TO THE USER PROFILE PAGE

(71) Applicant: Facebook, Inc., Menlo Park, CA (US)

(72) Inventor: David Abraham Harris, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 19 days.

(21) Appl. No.: 16/542,217

(22) Filed: Aug. 15, 2019

(51) Int. Cl.
| | |
|---|---|
| *G06F 15/16* | (2006.01) |
| *H04L 29/08* | (2006.01) |
| *G06T 13/80* | (2011.01) |
| *G06F 16/9535* | (2019.01) |
| *G06F 16/958* | (2019.01) |
| *G06Q 50/00* | (2012.01) |

(52) U.S. Cl.
CPC .... *H04L 29/08936* (2013.01); *G06F 16/9535* (2019.01); *G06F 16/972* (2019.01); *G06T 13/80* (2013.01); *G06Q 50/01* (2013.01)

(58) Field of Classification Search
CPC ........... H04L 29/08936; G06F 16/9535; G06F 16/972; G06T 13/80; G06Q 50/01
See application file for complete search history.

(56) References Cited

U.S. PATENT DOCUMENTS

| | | | |
|---|---|---|---|
| 10,540,431 B2 * | 1/2020 | Milvaney | G06F 3/0482 |
| 10,803,157 B2 * | 10/2020 | Li | G06F 3/017 |
| 2015/0026214 A1 * | 1/2015 | Monahan | G06Q 50/265 |
| | | | 707/782 |
| 2017/0185254 A1 * | 6/2017 | Zeng | G06F 3/0482 |
| 2019/0096113 A1 * | 3/2019 | Stukalov | G06T 11/001 |
| 2020/0090813 A1 * | 3/2020 | Hann | A61B 5/744 |

* cited by examiner

*Primary Examiner* — Anh Nguyen
(74) *Attorney, Agent, or Firm* — Fenwick & West LLP

(57) ABSTRACT

An online system receives a request from a posting user to post content describing a type of life event about the posting user to a user profile page of the posting user as well as a privacy setting for the content. The online system accesses a set of animations, in which each animation is associated with a type of life event and selects an animation that is associated with the type of life event about the posting user. Upon receiving a request from a viewing user to view the user profile page, the online system determines whether to include the selected animation in the user profile page based on the privacy setting and information describing a connection between the users. Based on the determination, the online system generates a user interface including at least the user profile page and sends the user interface for display to the viewing user.

20 Claims, 8 Drawing Sheets

PRESENTING A USER PROFILE PAGE INCLUDING AN ANIMATION ASSOCIATED WITH A TYPE OF LIFE EVENT DESCRIBED BY CONTENT POSTED TO THE USER PROFILE PAGE

TECHNICAL FIELD

This disclosure relates generally to online systems, and more specifically to presenting a user profile page including an animation associated with a type of life event described by content posted to the user profile page.

BACKGROUND

Conventionally, online systems allow their users to connect to and communicate with other online system users by allowing the users to post content for presentation to additional online system users. The content may be posted by online system users to user profile pages of the users and subsequently viewed by additional online system users. Furthermore, the content may describe various types of life events about the users who have posted the content. For example, an online system user may post content describing their graduation from college or the birth of their child. Given the significance of many types of life events that may be described by content posted to user profile pages, such content is likely to be of particular interest to online system users who are viewing the user profile pages.

However, due to the significant amount of additional types of content that may be included in user profile pages, online system users who are viewing the user profile pages may overlook content describing life events about the users whose user profile pages they are viewing. For example, suppose that an online system user posts content to their user profile page, in which the content contains only text describing their recent promotion to a new position within a company. In this example, in addition to the content describing the promotion, content included in the user profile page may include photos or videos previously posted by the user, information describing actions performed by the user (e.g., check-ins to physical locations), advertisements for various products or services, etc. In the above example, this additional content in the user profile page may be distracting to additional online system users viewing the user profile page who consequently may not become aware of the promotion.

SUMMARY

Online systems conventionally allow their users to connect to and communicate with other online system users by allowing the users to post content to their user profile pages. The content may describe various types of life events about the users likely to be of particular interest to additional online system users viewing the user profile pages. However, due to the significant amount of additional types of content (e.g., advertisements and previously posted content) that may be included in user profile pages, online system users who are viewing the user profile pages may overlook content describing life events about the online system users whose user profile pages they are viewing.

To highlight life events described by content posted to user profile pages of online system users, an online system may present a user profile page including an animation associated with a type of life event described by content posted to the user profile page. More specifically, the online system receives a request from a posting user of the online system to post content describing a type of life event about the posting user (e.g., a birthday, an anniversary, a graduation, a relocation, etc.) to a user profile page of the posting user. The online system also receives a privacy setting for the content (e.g., private, public, custom, etc.) from the posting user. The online system then accesses a set of animations maintained in the online system, in which each animation is associated with a type of life event and selects an animation that is associated with the type of life event described by the content. Upon receiving a request from a viewing user of the online system to view the user profile page of the posting user, the online system determines whether to include the selected animation in the user profile page. The online system makes this determination based at least in part on the privacy setting and information describing a connection between the posting user and the viewing user in the online system. Based on the determination, the online system generates a user interface that includes at least the user profile page and sends the user interface for display to the viewing user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
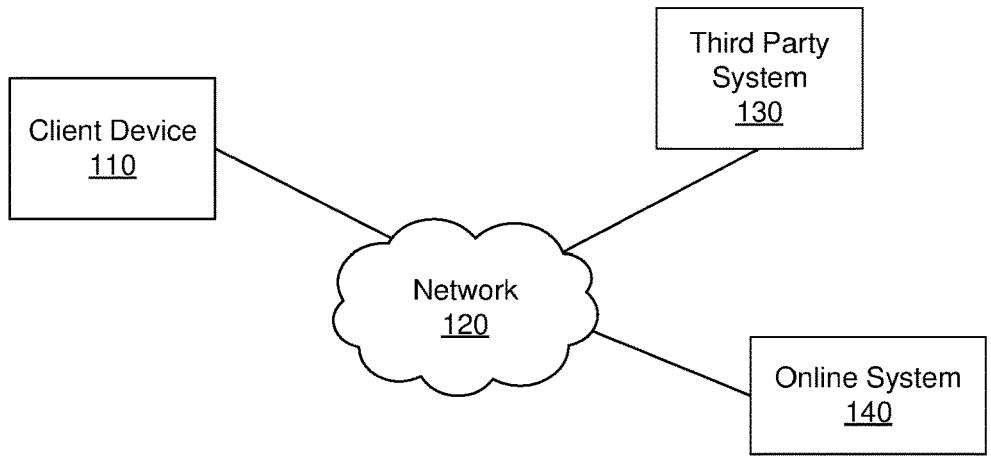
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
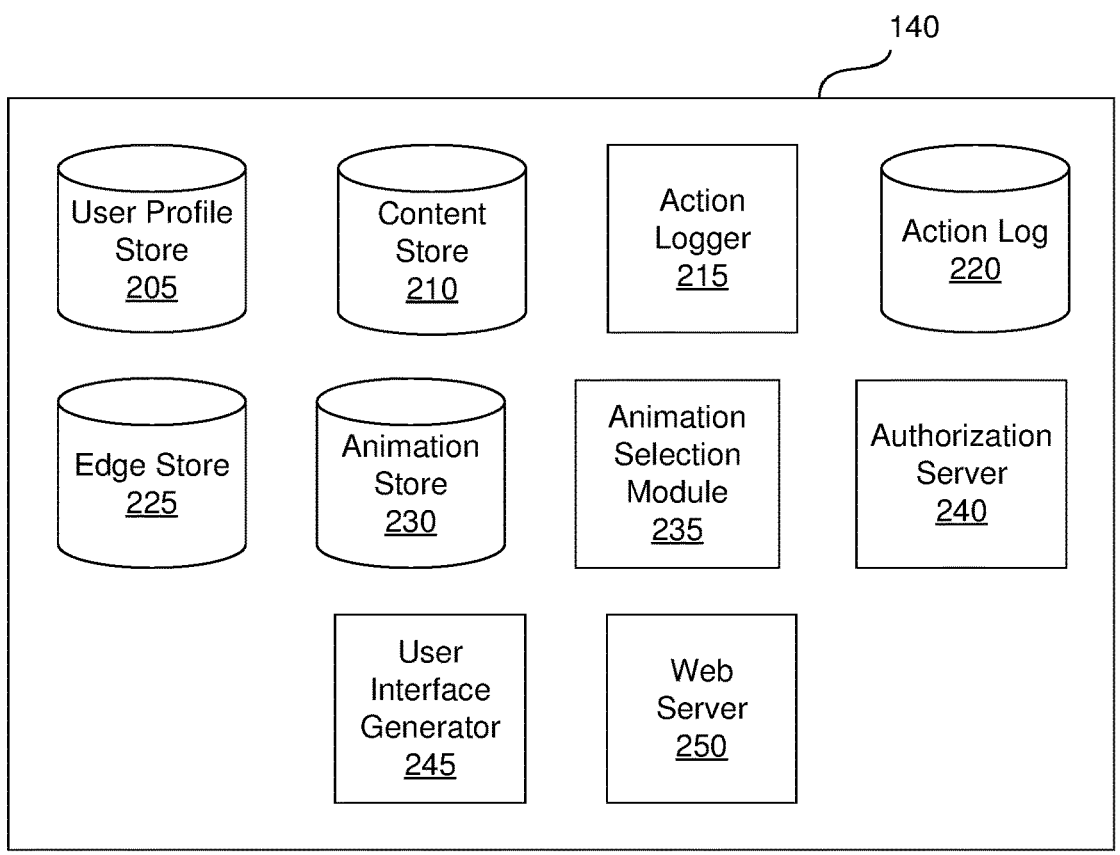
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an animation store 230, an animation selection module 235, an authorization server 240, a user interface generator 245, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, an image (e.g., a photograph), a video, a link, a shared content item, a gaming application achievement, a check-in event at a local business, a page (e.g., a brand page or a user profile page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The animation store 230 stores a set of animations, in which each animation is associated with a type of life event. In some embodiments, multiple animations stored in the animation store 230 may be associated with the same type of life event. Examples of types of life events include birthdays, anniversaries, graduations, engagements, relocations, promotions, or any other suitable types of major events that may take place during the lives of online system users. Each animation may include images (e.g., icons, photographs, etc.), text, or any other suitable types of objects that may move within a display area of a client device 110 at which the animation is presented. For example, an animation associated with a type of life event corresponding to a graduation may include moving text that reads "Congratulations Graduate!" as well as moving images of confetti, streamers, balloons, fireworks, a garland, a diploma, and a graduation hat. In some embodiments, one or more of the animations may conclude with one or more decorative elements. In the above example, the animation may conclude with decorative elements corresponding to the images of the graduation hat and the diploma such that the images of the graduation hat and the diploma remain displayed after the text and the images of the confetti, streamers, balloons, fireworks, and garland are no longer displayed. In various embodiments, an animation may include multiple variations. In such embodiments, the animation may be slightly different each time it is played. Alternatively, different variations of the animation may be played based on information describing a connection between a viewing user of the online system 140 and a posting user of the online system 140, as described below.

In various embodiments, one or more animations stored in the animation store 230 may be compound animations that include one or more layers (e.g., a background layer and a foreground layer), in which at least one of the layers is animated. In such embodiments, one or more of the layers may include one or more open slots that may be customized (e.g., with information associated with a posting user of the online system 140 and/or an additional user of the online system 140). For example, if an animation stored in the animation store 230 includes one or more layers with open slots, the open slots may be customized by inserting a name and/or a profile image of a posting user of the online system 140 and a viewing user of the online system 140. Compound animations are further described in U.S. patent application Ser. No. 16/163,956, filed on Oct. 18, 2018 and U.S. patent application Ser. No. 16/163,976, filed on Oct. 18, 2018, each of which is hereby incorporated by reference in its entirety. The animation store 230 is further described below in conjunction with FIG. 3.

The animation selection module 235 accesses (e.g., as shown in step 315 of FIG. 3) the animation store 230 and selects (e.g., as shown in step 320 of FIG. 3) an animation associated with a type of life event about a posting user of the online system 140 described by content received from the posting user. For example, if the type of life event corresponds to a birthday, the animation selection module 235 accesses the animation store 230 and selects an animation associated with birthdays. In embodiments in which multiple animations stored in the animation store 230 are associated with the same type of life event, the animation selection module 235 may select multiple animations associated with the type of life event about the posting user described by the content received from the posting user.

In various embodiments, the animation selection module 235 also may determine a type of life event about a posting user of the online system 140 that is described by content received from the posting user. In such embodiments, the animation selection module 235 may make this determination based on information maintained in the online system 140 associated with the posting user and/or the content itself. For example, the animation selection module 235 may determine that a type of life event about the posting user described by content received from the posting user corresponds to a graduation based on information stored in the user profile store 205 indicating that the posting user is a college student as well as information included in the content. In this example, the content may include keywords associated with graduations (e.g., "graduating," "school," "college," "diploma," "class of . . . ," "magna cum laude," etc.) and an image associated with graduations (e.g., an image of a graduation hat). The functionality of the animation selection module 235 is further described below in conjunction with FIG. 3.

The authorization server 240 enforces one or more privacy settings of users of the online system 140. A privacy setting of a user determines how particular information associated with the user may be shared, and may be stored in the user profile of the user in the user profile store 205 or stored in the authorization server 240 and associated with the user profile. In one embodiment, a privacy setting specifies particular information associated with a user and identifies the entity or entities with whom the specified information may be shared. Examples of entities with which information associated with a user may be shared may include other users, applications, third-party systems 130, or any entity that potentially may access the information. Examples of information that may be shared by a user include user profile information such as the user's profile photo, phone numbers associated with the user, the user's connections, actions performed by the user such as adding a connection, changing their user profile information, and the like.

The privacy setting specification may be provided at different levels of granularity. In one embodiment, a privacy setting may identify specific information to be shared with other entities. For example, the privacy setting identifies a work phone number or a specific set of related information, such as personal information including a profile photo, a home phone number, and a status. Alternatively, the privacy setting may apply to all the information associated with a user. Specification of the set of entities that may access particular information may also be specified at various levels of granularity. Various sets of entities with which information may be shared may include, for example, all users connected to a user, a set of users connected to the user, a set of users indirectly connected to the user, all applications, all third-party systems 130, specific third-party systems 130, or all external systems.

One embodiment uses an enumeration of entities to specify the entities allowed to access identified information or to identify types of information presented to different entities. For example, a user may specify types of actions that are communicated to other users or communicated to a specified group of users. Alternatively, a user may specify types of actions or other information that is not published or presented to other users.

The authorization server 240 includes logic to determine if certain information associated with a user may be accessed by a user's friends, a third-party system 130, and/or other applications and entities. For example, a third-party system 130 that attempts to access a user's comment about a uniform resource locator (URL) associated with the third-party system 130 must get authorization from the authorization server 240 to access information associated with the user. Based on a user's privacy settings, the authorization server 240 determines if another user, a third-party system 130, an application, or another entity is allowed to access information associated with the user, including information about actions taken by the user. For example, the authorization server 240 uses a user's privacy setting to determine if the user's comment about a URL associated with the third-party system 130 may be presented to the third-party system 130 or may be presented to another user. This enables a user's privacy setting to specify which other users or other entities are allowed to receive data about the user's actions or other data associated with the user.

The authorization server 240 also determines (e.g., as shown in step 340 of FIG. 3) whether to include an animation selected by the animation selection module 235 in a user profile page of a posting user of the online system 140. The authorization server 240 may make this determination based at least in part on a privacy setting for content describing a type of life event about the posting user associated with the selected animation and information describing a connection between the posting user and a viewing user of the online system 140 requesting to view the user profile page. For example, suppose that a privacy setting for content describing a type of life event about a posting user of the online system 140 is set such that only friends of the posting user may view the content. In this example, if information maintained in the edge store 225 describing a connection between the posting user and a viewing user of the online system 140 requesting to view a user profile page of the posting user indicates that the viewing user and the posting user are friends, the authorization server 240 may determine that an animation selected by the animation selection module 235 associated with the type of life event should be included in the user profile page. Alternatively, in the above example, if the privacy setting for the content is set such that only specific friends of the posting user may view the content and the information describing the connection between the users indicates that the viewing user is not included among these specific friends, the authorization server 240 may determine that the selected animation should not be included in the user profile page.

In embodiments in which an animation selected by the animation selection module 235 includes multiple variations, the authorization server 240 also may determine which variation of the selected animation to include in a user profile page of a posting user of the online system 140. In such embodiments, the authorization server 240 may make this determination based on information describing a connection between the posting user and a viewing user of the online system 140 who has requested to view the user profile page. For example, the authorization server 240 may determine that one variation of the selected animation may be included in the user profile page if the viewing user is a family member or a close friend of the posting user and that another variation of the selected animation may be included in the user profile page if the viewing user is a friend of the posting user, but is not a close friend or a family member of the posting user.

In embodiments in which an animation selected by the animation selection module 235 concludes with a decorative element, the authorization server 240 also may determine whether to include the decorative element in a user profile page of a posting user of the online system 140. The authorization server 240 may make this determination based on a number of times that the user profile page including the selected animation has been sent for display to a viewing user of the online system 140 and/or a frequency with which the user profile page including the selected animation has been sent for display to the viewing user. For example, if the user profile page including the selected animation has been sent for display to the viewing user at least a threshold number of times and/or if the frequency with which the user profile page including the selected animation has been sent for display to the viewing user is at least a threshold frequency, the authorization server 240 may determine that the decorative element, rather than the selected animation, should be included in the user profile page. Alternatively, in this example, if the user profile page including the selected animation has been sent for display to the viewing user less than the threshold number of times and/or if the frequency with which the user profile page including the selected animation has been sent for display to the viewing user is less than the threshold frequency, the authorization server 240 may determine that the selected animation should be included in the user profile page.

In some embodiments, an animation selected by the animation selection module 235 and/or a decorative element that concludes the animation may be eligible to be included in a user profile page of a posting user of the online system 140 during a period of time. In such embodiments, the authorization server 240 also may determine whether to include the selected animation or the decorative element in the user profile page based on the period of time. The period of time may begin when the online system 140 receives a request from the posting user to post content describing a type of life event about the posting user associated with the selected animation to the user profile page of the posting user. Furthermore, the period of time may be a default period of time (e.g., two weeks). Alternatively, the period of time may be specified by the posting user (e.g., to coincide with a duration of the type of life event about the posting user described by the content). For example, suppose that the online system 140 receives a request from the posting user to post content describing a type of life event about the posting user to the user profile page of the posting user and that the type of life event corresponds to a three week vacation. In this example, the posting user may specify that the period of time during which an animation selected by the animation selection module 235 associated with the type of life event and/or a decorative element concluding the animation are eligible to be included in the user profile page of the posting user is three weeks from the time that the online system 140 receives the request from the posting user to post the content to the user profile page.

In embodiments in which the online system 140 prompts a posting user of the online system 140 to authorize an animation selected by the animation selection module 235 to be included in a user profile page of the posting user, as described below, the authorization server 240 also may determine whether to include the selected animation or a decorative element that concludes the animation in the user profile page based on whether the online system 140 receives authorization from the posting user. In such embodiments, the authorization server 240 may determine that the selected animation or the decorative element should be included in the user profile page if the online system 140 receives the authorization. Alternatively, the authorization server 240 may determine that neither the selected animation nor the decorative element should be included in the user profile page if the online system 140 does not receive the authorization. The functionality of the authorization server 240 is further described below in conjunction with FIG. 3.

In various embodiments, the user interface generator 245 may generate a user interface that allows a posting user of the online system 140 to specify a type of life event about the posting user described by content received from the posting user. In such embodiments, the user interface may include one or more selectable menus (e.g., in the form of selectable icons, checkboxes, a drop-down menu, etc.) that allow the posting user to specify the type of life event. For example, the user interface generator 245 may generate a user interface that includes a selectable menu of categories of types of life events (e.g., work, education, relationship, etc.) that may be described by content received from the posting user. In this example, in response to receiving a selection of a category from the posting user, the user interface may be updated to include a selectable menu of different types of life events that are included within the selected category (e.g., promotion, new job, left job, or retirement if the work category is selected).

In some embodiments, the user interface generator 245 also may generate a user interface that prompts (e.g., as shown in step 325 of FIG. 3) a posting user of the online system 140 to authorize an animation selected by the animation selection module 235 to be included in a user profile page of the posting user. In such embodiments, the user interface may include one or more interactive elements that allow the posting user to indicate whether they have authorized the selected animation to be included in the user profile page. For example, the user interface generator 245 may generate a pop-up window that is sent for display to the posting user, in which the pop-up window requests that the posting user authorize the selected animation to be included in the user profile page of the posting user. In this example, the pop-up window may include a button that allows the posting user to indicate that they authorize the animation to be included in the user profile page as well as a button that allows the posting user to indicate that they do not authorize the animation to be included in the user profile page.

In some embodiments, a user interface generated by the user interface generator 245 that prompts a posting user of the online system 140 to authorize an animation selected by the animation selection module 235 to be included in a user profile page of the posting user may include additional elements. In embodiments in which the animation selection module 235 selects multiple animations, the user interface also may prompt the posting user to select an animation to be included in the user profile page of the posting user from the selected animations. For example, the user interface may include a description of each of multiple animations selected by the animation selection module 235 as well as a button or other interactive element that allows the posting user to select an animation to be included in the user profile page. In various embodiments, the user interface also may include a preview of one or more animations selected by the animation selection module 235 if the animation(s) were to be included in the user profile page of the posting user. In the above example, if the posting user hovers a cursor over a description of an animation, the user interface also may include a preview of the corresponding animation as it would appear if it were included in the user profile page of the posting user.

In various embodiments, a user interface generated by the user interface generator 245 that prompts a posting user of the online system 140 to authorize an animation selected by the animation selection module 235 to be included in a user profile page of the posting user also may include a set of options that may be selected and/or edited by the posting user. In such embodiments, the user interface may include options to select or edit the following: a category of a type of life event associated with content received from the posting user, the type of life event associated with the content, a privacy setting for the content, a period of time during which the selected animation and/or a decorative element concluding the animation are eligible to be included in the user profile page, a color scheme or an effect (e.g., fade in or out) associated with the animation and/or the decorative element, one or more objects included in the animation, a set of sounds to be played in conjunction with the animation and/or the decorative element, positions of the decorative element and/or one or more objects included in the animation within the user profile page, a scale, an opacity, a rotation, or a color of the decorative element and/or one or more objects included in the animation, an option for a client device 110 to vibrate in conjunction with presenting the decorative element and/or the animation, etc. In embodiments in which the user interface also includes a preview of an animation, the user interface generator 245 may update the preview based on one or more options selected and/or edited by the posting user.

The user interface generator 245 also generates (e.g., as shown in step 345 of FIG. 3) a user interface that includes at least a user profile page of a posting user of the online system 140 based on whether the authorization server 240 determines that an animation selected by the animation selection module 235 or a decorative element that concludes the animation should be included in the user profile page. In embodiments in which the authorization server 240 determines that the selected animation or the decorative element should be included in the user profile page, the user interface includes the user profile page as well as the selected animation or the decorative element. For example, suppose that the authorization server 240 determines that an animation selected by the animation selection module 235 should be included in the user profile page of the posting user, in which the selected animation includes moving images of a birthday banner, a birthday cake, and a birthday hat. In this example, the user interface generated by the user interface generator 245 includes the user profile page and the animation such that the birthday banner and the birthday cake appear to move along paths from a right side of a display area in which the user interface is presented to an area next to a user profile image of the posting user and the birthday hat may appear to move along a path from the left side of the display area to an area just above the user profile image. In embodiments in which a set of options are included in a user interface sent for display to the posting user and the posting user selects and/or edits one or more of the options, the user interface generator 245 may generate the user interface based on the option(s) selected and/or edited by the posting user (e.g., based on a color scheme for the selected animation selected by the posting user). In embodiments in which the authorization server 240 determines that neither the selected animation nor the decorative element should be included in the user profile page, the user interface generated by the user interface generator 245 includes only the user profile page.

In embodiments in which the authorization server 240 determines that an animation selected by the animation selection module 235 or a decorative element that concludes the animation should be included in a user profile page of a posting user of the online system 140, one or more objects within the animation or the decorative element may be overlaid onto the user profile page based on a user profile image of the posting user. In some embodiments, the object(s) within the selected animation or the decorative element may be overlaid based on a border of the user profile image of the posting user. In the above example, the user interface generator 245 may generate the user interface based on a border of the user profile image of the posting user such that the birthday hat is displayed along the border of the user profile image of the posting user. Alternatively, the object(s) within the selected animation or the decorative element may be overlaid onto the user profile page based on a set of facial features detected within the user profile image of the posting user. In the above example, the user interface generator 245 may generate the user interface based on a set of facial features detected within the user profile image of the posting user such that the posting user appears to be wearing the birthday hat. The functionality of the user interface generator 245 is further described below in conjunction with FIGS. 3, 4A-4C, and 5A-5C.

The web server 250 links the online system 140 via the network 120 to the one or more client devices 110, as well as to the one or more third-party systems 130. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or BlackberryOS.

Figure 3:
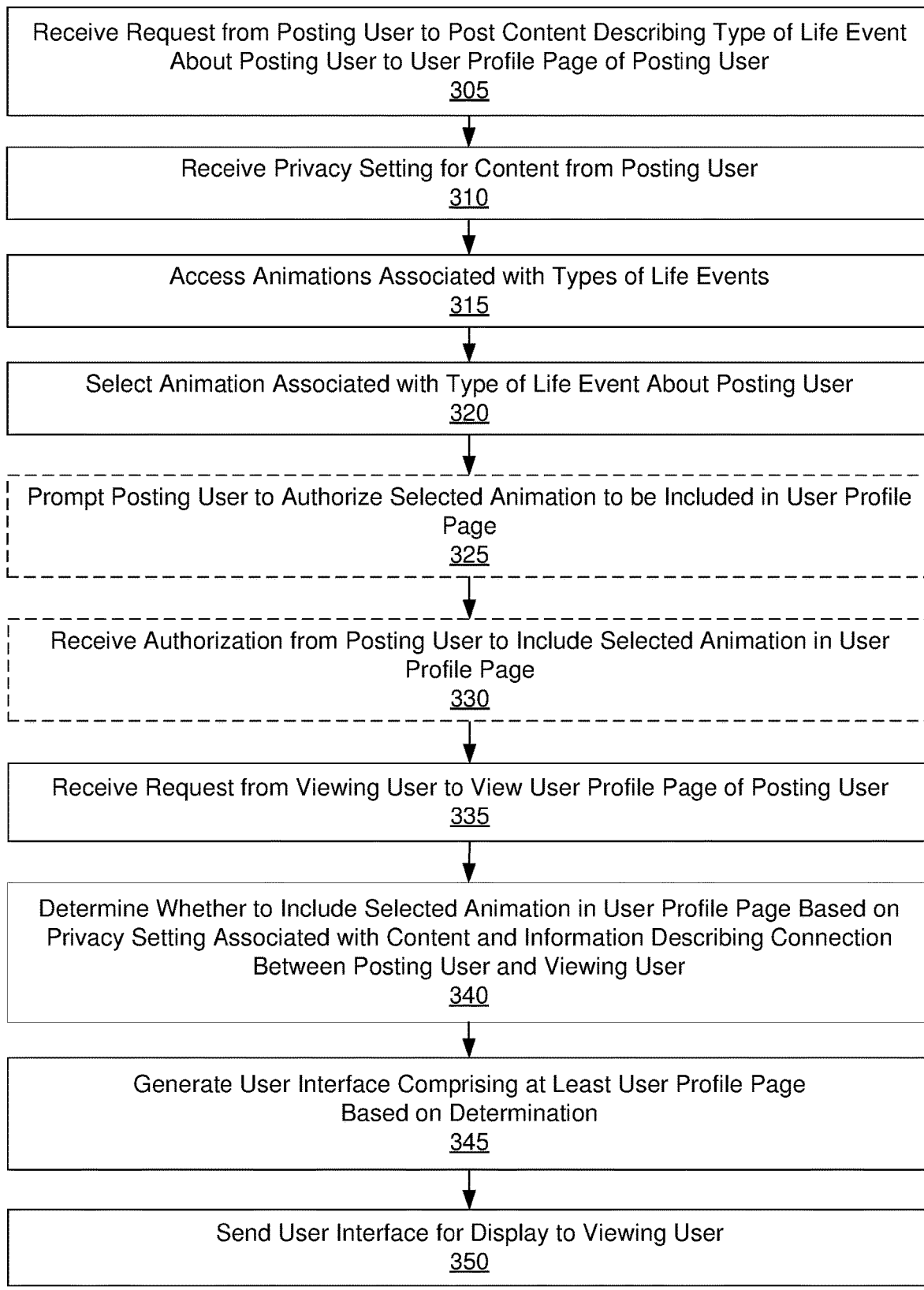
FIG. 3 is a flow chart of a method for presenting a user profile page including an animation associated with a type of life event described by content posted to the user profile page, in accordance with an embodiment.

Presenting a User Profile Page Including an Animation Associated with a Type of Life Event Described by Content Posted to the User Profile Page FIG. 3 is a flow chart of a method for presenting a user profile page including an animation associated with a type of life event described by content posted to the user profile page. In other embodiments, the method may include different and/or additional steps than those shown in FIG. 3.

Additionally, steps of the method may be performed in a different order than the order described in conjunction with FIG. 3.

Figure 4A:
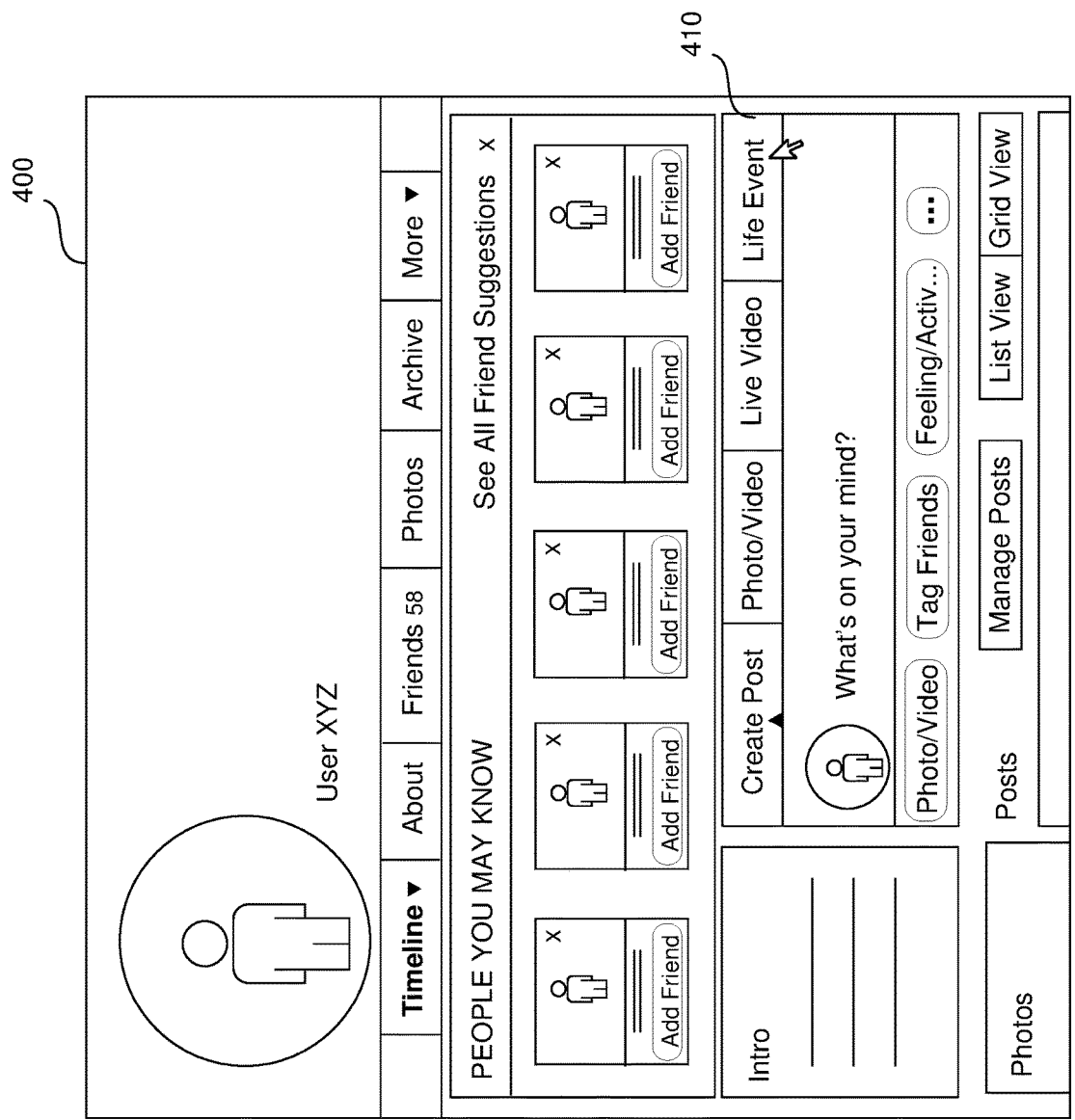
FIGS. 4A-4C illustrate an example of receiving a request to post content describing a type of life event to a user profile page, in accordance with an embodiment.
Figure 4B:
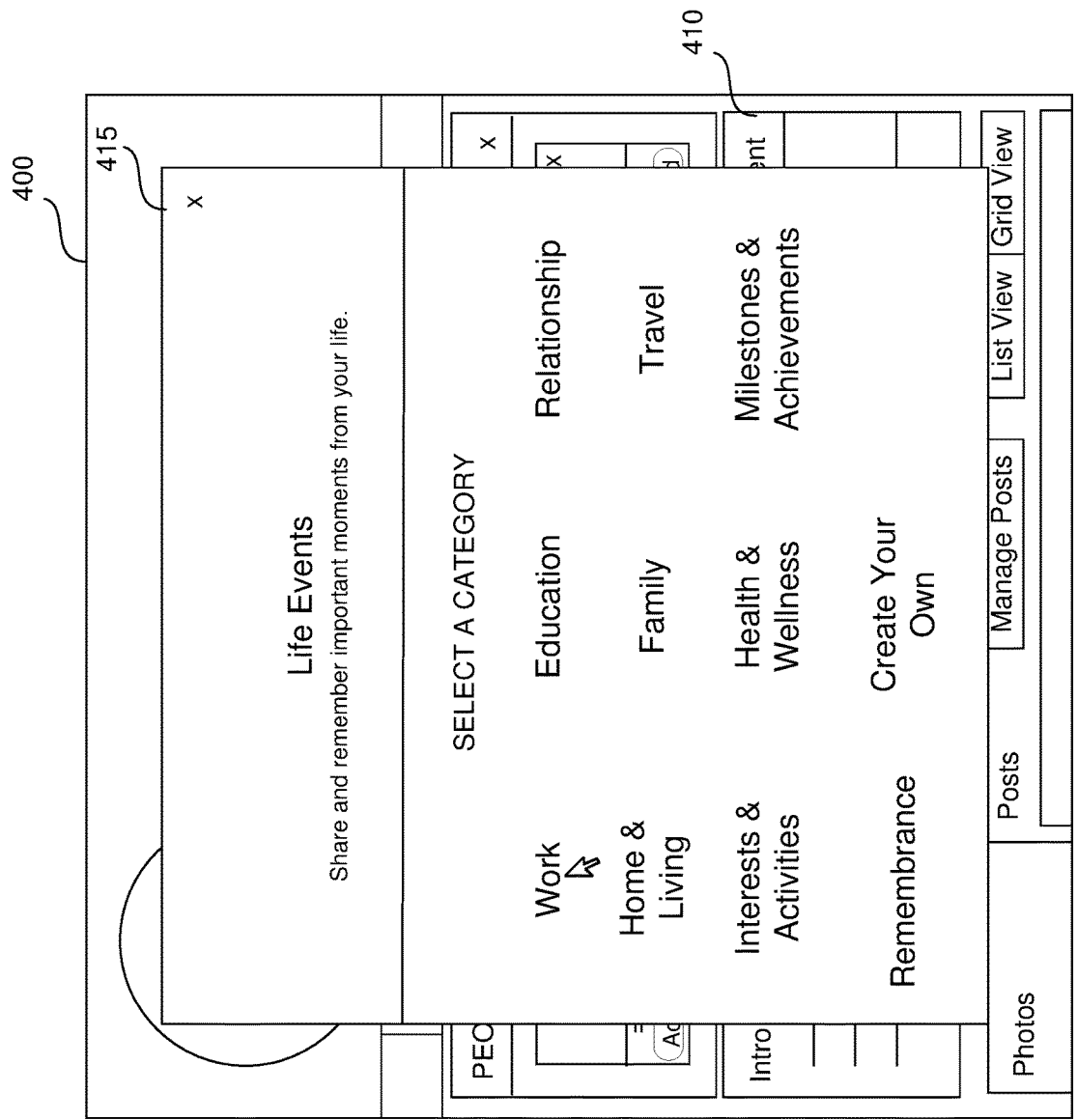
Figure 4C:
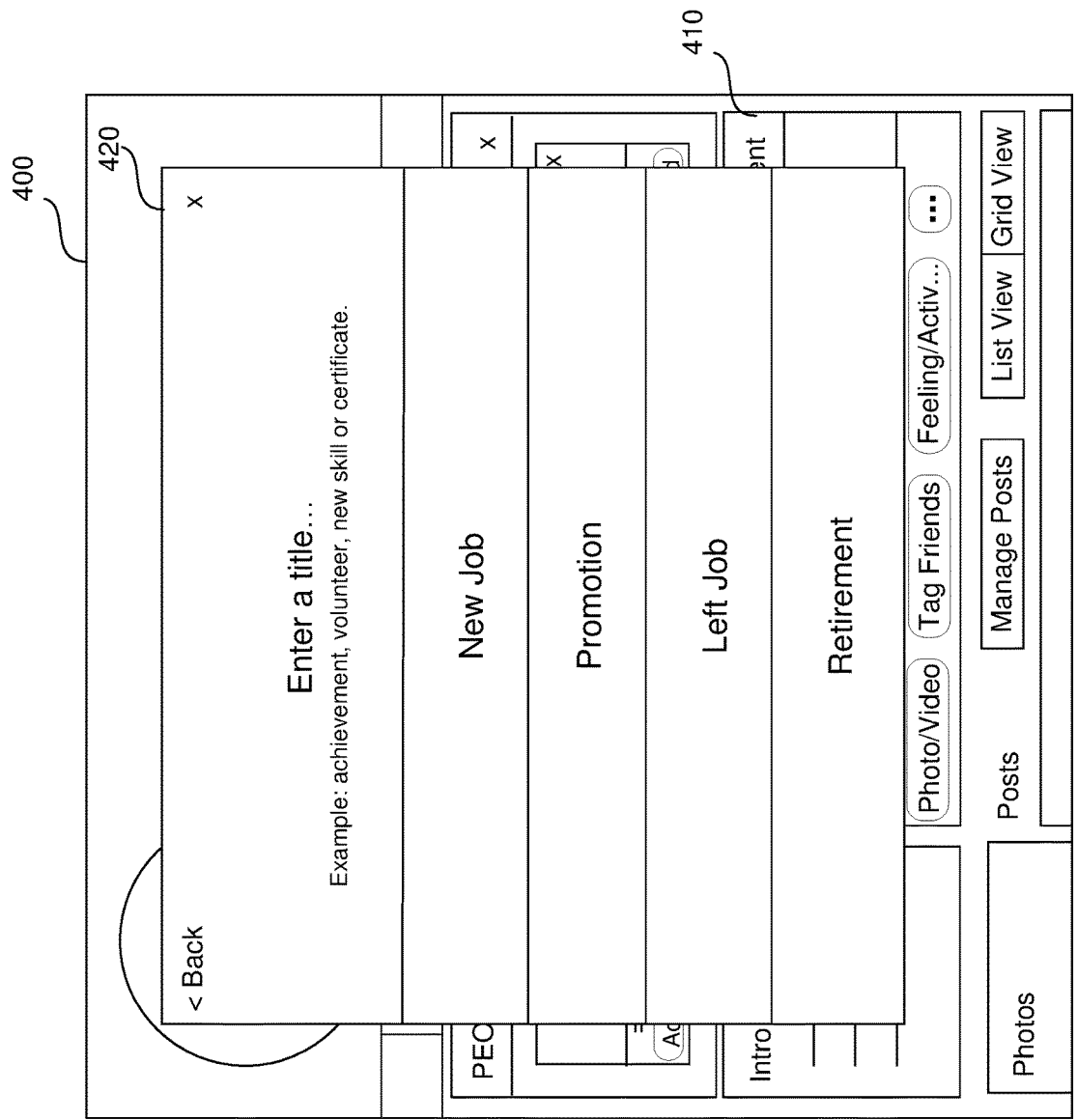

The online system 140 receives 305 a request from a posting user of the online system 140 to post content (e.g., text, images, videos, etc.) to a user profile page of the posting user, in which the content describes a type of life event about the posting user. Examples of types of life events include birthdays, anniversaries, graduations, engagements, relocations, promotions, or any other suitable types of major events that may take place during the lives of users of the online system 140. As shown in the example of FIG. 4A, the online system 140 may receive 305 the request via a user profile page 400 of the posting user. In this example, the online system 140 may receive an interaction from the posting user with a button 410 or other interactive element within the user profile page 400 indicating that the posting user is requesting to post content describing a type of life event about the posting user. In some embodiments, the online system 140 may determine (e.g., using the animation selection module 235) the type of life event based on information maintained in the online system 140 associated with the posting user (e.g., in the user profile store 205) and/or the content received from the posting user (e.g., based on keywords or images included in the content). In other embodiments, the posting user may specify the type of life event via a user interface generated by the online system 140 (e.g., using the user interface generator 245) that is sent for display to the posting user. As shown in the example of FIG. 4B, the user interface may include a selectable menu 415 of categories of types of life events (e.g., work, education, relationship, etc.) that may be described by the content received from the posting user. As shown in the example of FIG. 4C, in response to receiving a selection of a work category from the posting user, the user interface may be updated to include a selectable menu 420 of different types of life events such as promotion, new job, left job, or retirement, that are included within the work category.

Referring back to FIG. 3, the online system 140 then receives 310 a privacy setting (e.g., private, public, custom, etc.) for the content from the posting user. As described above, the privacy setting for the content may specify one or more additional users of the online system 140 who are eligible to access the content. For example, the online system 140 may receive 310 a privacy setting for the content from the posting user, in which the privacy setting corresponds to a custom privacy setting that specifies that the content may be accessed only by specific friends of the posting user.

The online system 140 then accesses 315 (e.g., using the animation selection module 235) a set of animations maintained in the online system 140 (e.g., in the animation store 230) and selects 320 (e.g., using the animation selection module 235) an animation associated with the type of life event about the posting user described by the content from the set of animations. For example, if the type of life event corresponds to a relocation, the online system 140 accesses 315 the set of animations and selects 320 an animation associated with relocations from the set of animations. As described above, each animation maintained in the online system 140 is associated with a type of life event and in some embodiments, multiple animations may be associated with the same type of life event. In embodiments in which multiple animations maintained in the online system 140 are associated with the same type of life event, the online system 140 may select 320 multiple animations associated with the type of life event about the posting user described by the content received from the posting user. As also described above, each animation may include images (e.g., icons, photographs, etc.), text, or any other suitable types of objects. For example, an animation associated with a type of life event corresponding to a birthday may include moving images of a birthday banner, a birthday cake, and a birthday hat. In some embodiments, one or more of the animations may conclude with a decorative element. In the above example, the animation may conclude with a decorative element corresponding to the birthday hat such that the birthday hat remains displayed after the images of the birthday banner and the birthday cake are no longer displayed (e.g., after they fade out).

In some embodiments, the online system 140 may prompt 325 the posting user to authorize the selected animation to be included in the user profile page of the posting user. The online system 140 may do so by generating (e.g., using the user interface generator 245) a user interface (e.g., a pop-up window) that prompts 325 the posting user for their authorization, in which the user interface includes one or more interactive elements (e.g., buttons) that allow the posting user to indicate whether they have authorized the animation to be included in the user profile page. In embodiments in which the online system 140 selects 320 multiple animations associated with the type of life event about the posting user described by the content, the user interface also may prompt the posting user to select an animation to be included in the user profile page of the posting user from the selected animations. In various embodiments, the user interface also may include a preview of one or more of the selected animations if the animation(s) were to be included in the user profile page of the posting user.

In embodiments in which the online system 140 prompts 325 the posting user to authorize the selected animation to be included in the user profile page of the posting user, the user interface generated by the online system 140 that prompts 325 the posting user to do so may include a set of options that may be selected and/or edited by the posting user. For example, the user interface may include options to select or edit the privacy setting for the content, a period of time during which the selected animation and/or a decorative element concluding the selected animation are eligible to be included in the user profile page, an option for a client device 110 to vibrate in conjunction with presenting the decorative element and/or the selected animation, etc. In embodiments in which the user interface includes a preview of an animation, the online system 140 may update the preview based on one or more options selected and/or edited by the posting user.

Referring back to FIG. 3, once the online system 140 has generated the user interface prompting 325 the posting user to authorize the selected animation to be included in the user profile page of the posting user, the online system 140 may send the user interface for display to the posting user. The online system 140 subsequently may receive 330 authorization from the posting user to include the selected animation in the user profile page of the posting user. Alternatively, the online system 140 subsequently may not receive 330 authorization from the posting user to include the selected animation in the user profile page of the posting user. In embodiments in which the online system 140 receives 330 authorization from the posting user to include the selected animation in the user profile page of the posting user, the online system 140 subsequently may receive a request from the posting user to revoke their authorization, as described below.

Upon receiving 335 a request from a viewing user of the online system 140 to view the user profile page of the posting user, the online system 140 determines 340 (e.g., using the authorization server 240) whether to include the selected animation in the user profile page of the posting user. The online system 140 may make this determination based at least in part on the privacy setting for the content received 310 from the posting user and information describing a connection between the viewing user and the posting user. For example, suppose that the privacy setting for the content describing the type of life event about the posting user is set such that only friends of the posting user may view the content. In this example, if information maintained in the online system 140 (e.g., in the edge store 225) describing a connection between the viewing user and the posting user indicates that the viewing user and the posting user are friends, the online system 140 may determine 340 that the selected animation should be included in the user profile page. Alternatively, in the above example, if the privacy setting for the content is set such that only specific friends of the posting user may view the content and the information describing the connection between the users indicates that the viewing user is not included among these specific friends, the online system 140 may determine 340 that the selected animation should not be included in the user profile page. In embodiments in which the selected animation includes multiple variations, the online system 140 also may determine which variation of the selected animation to include in the user profile page based on the information describing the connection between the viewing user and the posting user.

In embodiments in which the selected animation concludes with a decorative element, the online system 140 also may determine 340 whether to include the selected animation or the decorative element in the user profile page of the posting user. As described above, the online system 140 may do so based on a number of times that the user profile page including the selected animation has been sent for display to the viewing user and/or a frequency with which the user profile page including the selected animation has been sent for display to the viewing user. As also described above, in embodiments in which the selected animation and/or the decorative element are eligible to be included in the user profile page of the posting user during a period of time (e.g., a default period of time or a period of time specified by the posting user), the online system 140 also may determine 340 whether to include the selected animation or the decorative element in the user profile page based on the period of time.

In embodiments in which the online system 140 prompts 325 the posting user to authorize the selected animation to be included in the user profile page of the posting user, the online system 140 also may determine 340 whether to include the selected animation or a decorative element concluding the selected animation in the user profile page based on whether the online system 140 receives 330 authorization from the posting user. In such embodiments, the online system 140 may determine 340 that the selected animation or the decorative element should be included in the user profile page if the online system 140 receives 330 the authorization. Alternatively, the online system 140 may determine 340 that neither the selected animation nor the decorative element should be included in the user profile page if the online system 140 does not receive 330 the authorization.

The online system 140 then generates 345 (e.g., using the user interface generator 245) a user interface that includes at least the user profile page of the posting user based on whether the online system 140 determines 340 that the selected animation or the decorative element should be included in the user profile page of the posting user. In embodiments in which the online system 140 determines 340 that neither the selected animation nor the decorative element should be included in the user profile page, the user interface generated 345 by the online system 140 includes only the user profile page. In embodiments in which the online system 140 determines 340 that the selected animation or the decorative element should be included in the user profile page, the user interface generated 345 by the online system 140 includes the user profile page as well as the selected animation or the decorative element.

Figure 5A:
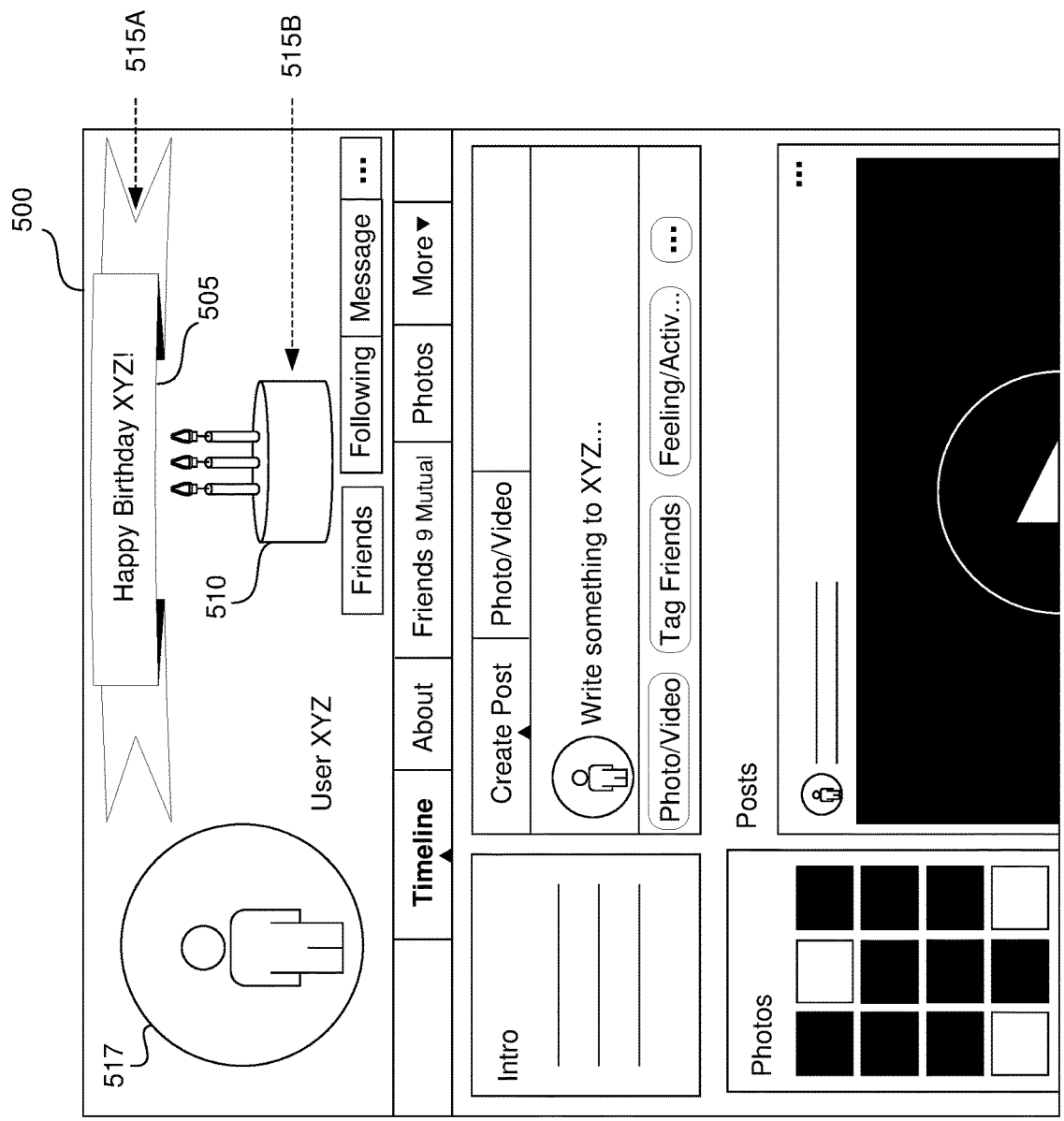
FIGS. 5A-5B illustrate an example user profile page including an animation associated with a type of life event described by content posted to the user profile page, in accordance with an embodiment.
Figure 5B:
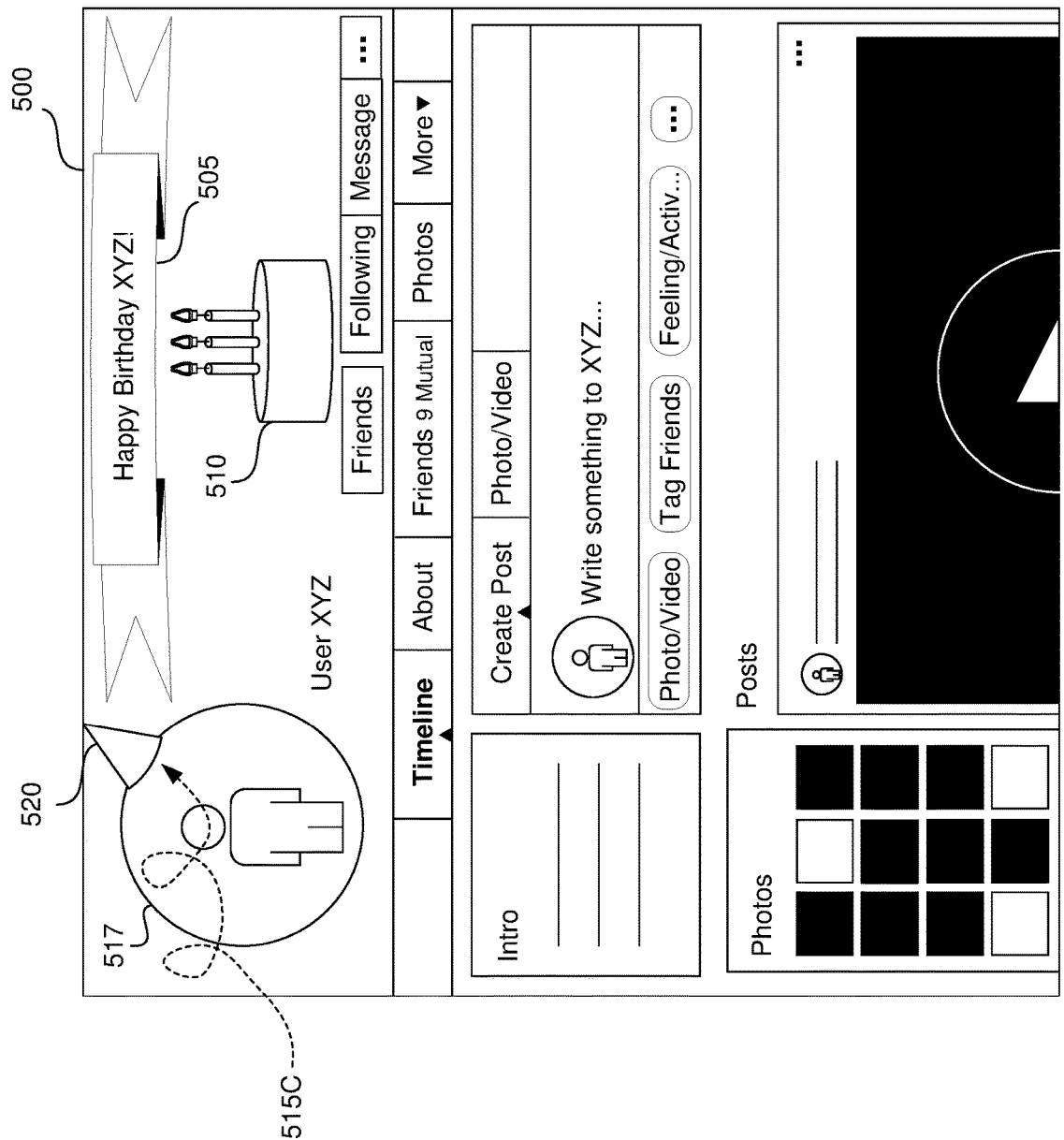
Figure 5C:
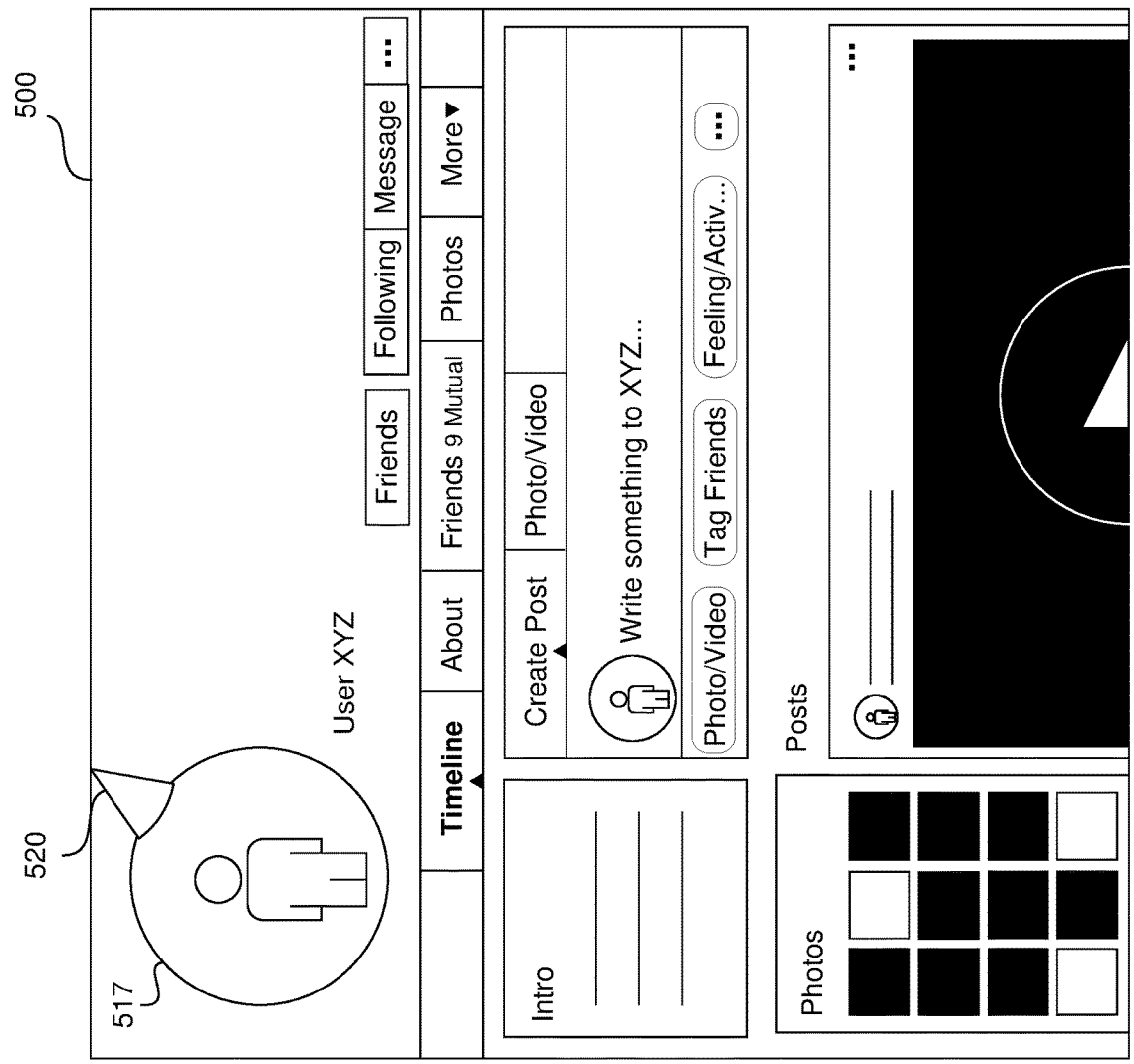
FIG. 5C illustrates an example user profile page including a decorative element that concludes an animation associated with a type of life event described by content posted to the user profile page, in accordance with an embodiment.

To illustrate an example of a user interface including the user profile page of the posting user and the selected animation, suppose that the online system 140 determines 340 that the selected animation should be included in the user profile page of the posting user, in which the selected animation includes moving images of a birthday banner, a birthday cake, and a birthday hat. As shown in the example of FIG. 5A, the user interface generated 345 by the online system 140 includes the user profile page 500 and the animation such that the birthday banner 505 appears to move along a path 515A from a right side of a display area in which the user interface is presented to an area next to a user profile image 517 of the posting user. As also shown in FIG. 5A, in some embodiments, the animation may include one or more open slots that may be customized such that the birthday banner 505 is customized with the name of the posting user (i.e., XYZ). In this example, the birthday cake 510 also appears to move along a similar path 515B. Then, as shown in the example of FIG. 5B, the birthday hat 520 may appear to move along a path 515C from the left side of the display area to an area just above the user profile image 517. In the above example, if the online system 140 instead determines 340 that a decorative element concluding the animation corresponding to the birthday hat 520 should be included in the user profile page 500, the user interface includes the user profile page 500 with only the birthday hat 520 located just above the user profile image 517, as shown in the example of FIG. 5C. In embodiments in which the posting user selects and/or edits one or more options, such as a color scheme associated with the selected animation and/or the decorative element, one or more objects included in the selected animation, etc., the online system 140 may generate 345 the user interface based on the option(s) selected and/or edited by the posting user.

In embodiments in which the online system 140 determines 340 that the selected animation or the decorative element should be included in the user profile page of the posting user, one or more objects within the animation or the decorative element may be overlaid onto the user profile page based on a user profile image of the posting user. In such embodiments, the object(s) within the selected animation or the decorative element may be overlaid based on a border of the user profile image of the posting user. In the examples illustrated in FIGS. 5B and 5C, the online system 140 may generate 345 the user interface based on a border of the user profile image 517 of the posting user such that the birthday hat 520 is displayed along the border of the user profile image 517 of the posting user. Alternatively, the object(s) within the animation or the decorative element may be overlaid based on a set of facial features detected within the user profile image of the posting user. Although not illustrated in FIGS. 5B and 5C, the online system 140 may generate 345 the user interface based on a set of facial features detected within the user profile image 517 of the posting user included in the user profile page 500 such that the posting user appears to be wearing the birthday hat 520.

Referring once more to FIG. 3, the online system 140 may then send 350 the user interface for display to the viewing user. For example, the online system 140 may send 350 the user interface for display in a display area of a client device 110 associated with the viewing user. In embodiments in which the user interface includes the user profile page and the selected animation, the selected animation may allow the viewing user to interact with the animation via the client device 110 to which the user interface is sent 350. Examples of types of interactions include a swipe across a display area of the client device 110 along an axis, a tap on the display area of the client device 110, a pinch inwards or outwards on the display area of the client device 110, a click on a button on the client device 110 or within the user interface, a movement of the client device 110 along an axis, a rotation of the client device 110 along an axis, a speed at which the client device 110 is moved, or any other suitable type of interaction. For example, if the user interface generated 345 by the online system 140 includes the user profile page and the selected animation, the viewing user may replay the selected animation by interacting with a button within the user interface. Alternatively, in the above example, the viewing user may close the animation by interacting with a different button within the user interface. Furthermore, in some embodiments, the client device 110 associated with the viewing user at which the user profile page associated with the posting user is displayed may vibrate and/or play a set of sounds in conjunction with displaying the user interface. For example, if the selected animation is associated with a type of life event corresponding to the birth of a child, while displaying the selected animation at the client device 110 associated with the viewing user, the client device 110 may first play a sound of a crying baby while vibrating and subsequently stop vibrating while playing a lullaby.

As described above, in some embodiments, the selected animation and/or the decorative element concluding the selected animation may be eligible to be included in the user profile page of the posting user during a default period of time or a period of time specified by the posting user. In such embodiments, the selected animation and/or the decorative element may no longer be included in the user profile page once the current time is not within the period of time. Furthermore, in some embodiments, the selected animation and/or the decorative element may no longer be included in the user profile page once the online system 140 receives a request from the posting user to revoke their authorization to include the selected animation and/or the decorative element in the user profile page.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a request from a posting user of an online system to post content to a user profile page of the posting user, the content describing a type of life event about the posting user;
receiving a privacy setting for the posted content from the posting user;
accessing a set of animations maintained in the online system, wherein each of the set of animations is associated with at least one of a plurality of types of life event;
selecting, from the set of animations, an animation that is associated with the type of life event about the posting user that is described in the posted content, where the selected animation is different than the posted content;
receiving a request from a viewing user of the online system to view the user profile page of the posting user;
determining whether to include the selected animation in the user profile page based at least in part on the privacy setting for the posted content and information describing a connection between the posting user and the viewing user in the online system;

generating a user interface comprising at least the user profile page based at least in part on the determining; and sending the user interface for display to the viewing user.

2. The method of claim 1, wherein the animation concludes with a decorative element.

3. The method of claim 2, further comprising:

determining whether to include the selected animation or the decorative element in the user profile page based at least in part on one or more of: a frequency with which the user profile page including the selected animation has been sent for display to the viewing user and a number of times that the user profile page including the selected animation has been sent for display to the viewing user.

4. The method of claim 2, further comprising:

determining whether to include the decorative element in the user profile page based at least in part on the privacy setting and the information describing the connection between the posting user and the viewing user in the online system.

5. The method of claim 2, further comprising:

determining whether to include the selected animation or the decorative element in the user profile page based at least in part on a period of time during which one or more of the selected animation and the decorative element are eligible to be included in the user profile page.

6. The method of claim 5, wherein the period of time corresponds to a default period of time.

7. The method of claim 2, further comprising:

receiving a request from the posting user to edit a period of time during which one or more of the selected animation and the decorative element are eligible to be included in the user profile page.

8. The method of claim 7, further comprising:

determining whether to include the selected animation or the decorative element in the user profile page based at least in part on the edited period of time during which the one or more of the selected animation and the decorative element are eligible to be included in the user profile page.

9. The method of claim 1, wherein the selected animation allows the viewing user to interact with the animation via a client device to which the user interface is sent for display to the viewing user.

10. The method of claim 1, further comprising:

prompting the posting user to authorize the selected animation to be included in the user profile page; and receiving authorization from the posting user to include the selected animation in the user profile page.

11. A computer program product comprising a non-transitory computer readable storage medium having instructions encoded thereon that, when executed by a processor, cause the processor to:

receive a request from a posting user of an online system to post content to a user profile page of the posting user, the content describing a type of life event about the posting user;

receive a privacy setting for the posted content from the posting user;

access a set of animations maintained in the online system, wherein each of the set of animations is associated with at least one of a plurality of types of life event;

select, from the set of animations, an animation that is associated with the type of life event about the posting user that is described in the posted content, where the selected animation is different than the posted content;

receive a request from a viewing user of the online system to view the user profile page of the posting user;

determine whether to include the selected animation in the user profile page based at least in part on the privacy setting for the posted content and information describing a connection between the posting user and the viewing user in the online system;

generate a user interface comprising at least the user profile page based at least in part on the determining; and send the user interface for display to the viewing user.

12. The computer program product of claim 11, wherein the animation concludes with a decorative element.

13. The computer program product of claim 12, wherein the computer-readable storage medium further has instructions encoded thereon that, when executed by the processor, cause the processor to:

determine whether to include the selected animation or the decorative element in the user profile page based at least in part on one or more of: a frequency with which the user profile page including the selected animation has been sent for display to the viewing user and a number of times that the user profile page including the selected animation has been sent for display to the viewing user.

14. The computer program product of claim 12, wherein the computer-readable storage medium further has instructions encoded thereon that, when executed by the processor, cause the processor to:

determine whether to include the decorative element in the user profile page based at least in part on the privacy setting and the information describing the connection between the posting user and the viewing user in the online system.

15. The computer program product of claim 12, wherein the computer-readable storage medium further has instructions encoded thereon that, when executed by the processor, cause the processor to:

determine whether to include the selected animation or the decorative element in the user profile page based at least in part on a period of time during which one or more of the selected animation and the decorative element are eligible to be included in the user profile page.

16. The computer program product of claim 15, wherein the period of time corresponds to a default period of time.

17. The computer program product of claim 12, wherein the computer-readable storage medium further has instructions encoded thereon that, when executed by the processor, cause the processor to:

receive a request from the posting user to edit a period of time during which one or more of the selected animation and the decorative element are eligible to be included in the user profile page.

18. The computer program product of claim 17, wherein the computer-readable storage medium further has instructions encoded thereon that, when executed by the processor, cause the processor to:

determine whether to include the selected animation or the decorative element in the user profile page based at least in part on the edited period of time during which the one or more of the selected animation and the decorative element are eligible to be included in the user profile page.

19. The computer program product of claim 11, wherein the selected animation allows the viewing user to interact with the animation via a client device to which the user interface is sent for display to the viewing user.

20. The computer program product of claim 11, wherein the computer-readable storage medium further has instructions encoded thereon that, when executed by the processor, cause the processor to:
 prompt the posting user to authorize the selected animation to be included in the user profile page; and
 receive authorization from the posting user to include the selected animation in the user profile page.

* * * * *